(12) United States Patent
Matsumoto

(10) Patent No.: US 12,124,300 B2
(45) Date of Patent: Oct. 22, 2024

(54) ELECTRONIC DEVICE

(71) Applicant: Wacom Co., Ltd., Saitama (JP)

(72) Inventor: Yoshiharu Matsumoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/161,537

(22) Filed: Jan. 30, 2023

(65) Prior Publication Data
US 2023/0176623 A1    Jun. 8, 2023

Related U.S. Application Data

(63) Continuation of application No. PCT/JP2021/026206, filed on Jul. 13, 2021.

(30) Foreign Application Priority Data

Aug. 11, 2020 (JP) ................. 2020-135557

(51) Int. Cl.
*G06F 1/16* (2006.01)
*G06F 3/041* (2006.01)
*G06F 3/044* (2006.01)
*G06F 3/046* (2006.01)
*G06F 3/0354* (2013.01)

(52) U.S. Cl.
CPC .......... *G06F 1/1652* (2013.01); *G06F 3/0414* (2013.01); *G06F 3/044* (2013.01); *G06F 3/046* (2013.01); *G06F 3/03547* (2013.01)

(58) Field of Classification Search
CPC ...... G06F 1/1652; G06F 3/0414; G06F 3/044; G06F 3/046; G06F 1/1637; G06F 1/1641; G06F 1/1643; G06F 2203/04102; G06F 2203/04106
See application file for complete search history.

(56) References Cited

U.S. PATENT DOCUMENTS

| | | | | |
|---|---|---|---|---|
| 2019/0250671 A1* | 8/2019 | Park | ...................... | G06F 3/0416 |
| 2021/0173437 A1* | 6/2021 | Bae | ........................ | G06F 1/1652 |
| 2021/0397221 A1* | 12/2021 | Hwang | .................... | G06F 3/041 |
| 2022/0294886 A1* | 9/2022 | Seo | ........................ | H04M 1/0237 |
| 2023/0034440 A1* | 2/2023 | Xie | ........................ | G06F 1/1641 |

FOREIGN PATENT DOCUMENTS

JP    2007-157107 A    6/2007

OTHER PUBLICATIONS

International Search Report, mailed Sep. 21, 2021, for International Application No. PCT/JP2021/026206, 4 pages.

* cited by examiner

*Primary Examiner* — Xuemei Zheng
(74) *Attorney, Agent, or Firm* — Seed IP Law Group LLP

(57) ABSTRACT

Provided is an electronic device including a display element, a first position detection sensor of an electromagnetic induction type disposed on a back side of the display element, wherein the first position detection sensor, in operation, detects a position pointed to on a display screen of the display element, and a reinforcing plate interposed between the display element and the first position detection sensor and having a slit part corresponding to an entire surface of the display screen, the slit part having slits of a first type and of a second type, each of the first type of the slits extending in a vertical direction of the display screen and each of the second type of the slits extending in a horizontal direction of the display screen, the first and second types of the slits being provided uniformly in a manner having substantially the same opening dimensions.

12 Claims, 7 Drawing Sheets

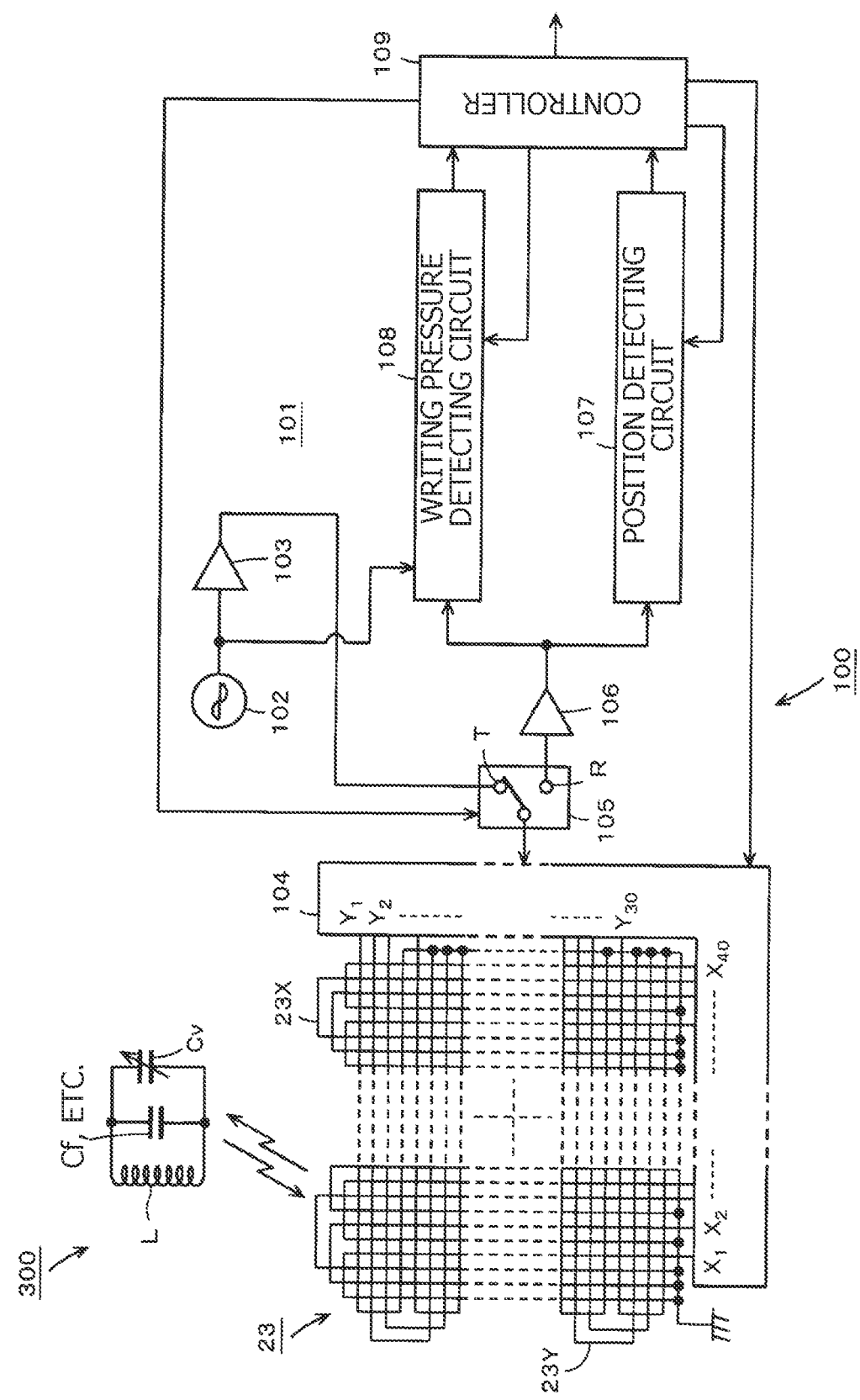

ELECTRONIC DEVICE

BACKGROUND

Technical Field

The present disclosure relates to an electronic device including a display apparatus and a position detection sensor mounted thereon, such as a high-performance mobile phone terminal known as a smartphone or a tablet personal computer (PC).

Description of the Related Art

What is generally called flexible display elements noted for their structural flexibility, such as organic electroluminescence displays and electronic paper displays, have come to be used in combination with diverse electronic devices including high-performance mobile phone terminals, tablet PCs, and electronic book readers. Flexible enough to be folded like a sheet of paper, the flexible display element is used conceivably as a display element for foldable mobile terminals known as foldable terminals.

To be foldable, the foldable mobile terminal cannot be provided with a hard protective member such as tempered glass on the display screen of its display element. This leads to a reduced overall strength of the mobile terminal and can pose problems such as a failure or damage caused by shocks that may be applied to the display screen, for example. To address such problems, the flexible display element is provided conceivably on its back side with a reinforcing plate typically made of a metal in a manner being bendable.

The foldable mobile terminal is conceivably equipped with an electromagnetic induction type position detection sensor or a capacitive type position detection sensor. In the case of rendering and inputting intricate figures, it is preferred that the foldable mobile terminal be equipped with the electromagnetic induction type position detection sensor for use in combination with an electromagnetic induction type position pointer (i.e., electronic pen). However, because the electromagnetic induction type position detection sensor is not transparent, the foldable terminal furnished with this type of sensor is to have this sensor disposed on the back side of the flexible display element.

In such a case, a reinforcing plate, if placed between the flexible display element and the electromagnetic induction type position detection sensor, disables detection of pointed positions. In the case of the electromagnetic induction type position detection sensor, it is necessary to mutually send and receive signals (magnetic fluxes) between the sensor and the position pointer (electronic pen). However, the reinforcing plate prevents transmission and reception of the magnetic fluxes. It is thus proposed, as disclosed in Japanese Patent Laid-Open No. 2007-157107 (referred to as Patent Document 1, hereinafter), to be discussed below, that slits (cuts) be formed in the reinforcing plate.

According to the invention disclosed in Patent Document 1, a grounding conductor layer (solid electrode) is interposed between an upper-layer capacitive type position detection sensor and a lower-layer electromagnetic induction type position detection sensor, the conductor layer being used to stabilize signals of the capacitive type position detection sensor. The conductor layer is formed with multiple slits arrayed in a vertical direction (longitudinal direction) over an operation surface, each of the slits extending in a horizontal direction (crosswise direction) of the operation surface. This conductor layer allows the upper-layer capacitive type position detection sensor to suitably detect pointed positions. The conductor layer further enables transmission and reception of signals between the lower-layer electromagnetic induction type position detection sensor and an electromagnetic induction type position pointer. The pointed positions are also carried out favorably via the lower-layer electromagnetic induction type position detection sensor.

In the case of the invention disclosed in Patent Document 1, as described above, the conductor layer is formed with multiple slits arranged in the longitudinal direction of the operation surface, each slit extending in the horizontal direction thereof. As a result, there occur two states: one in which the slits are above loop coils extending in the horizontal direction of the electromagnetic induction type position detection sensor, and another state in which the slits are not above the loop coils. Between the two states, there occur differences in the levels of the signals being transmitted and received. This conceivably makes it difficult to suitably detect the pointed positions. As a result, recently introduced apparatuses that require high-precision position detection over a wide range cannot adopt the invention disclosed in Patent Document 1, since the signals are not uniformly transmitted and received at any position on the operation surface between the electromagnetic induction type position detection sensor and the electromagnetic induction type position pointer.

In that case, it is conceivable to arrange, in the horizontal direction, multiple slits each extending vertically over a short distance between the slits extending horizontally in the conductor layer. This arrangement is intended to increase the dimensions of the slits so as to let the signals be transmitted and received at the same level at any position on the operation surface. The dimensions of the slits may conceivably be increased in like manner on the reinforcing plate interposed between the flexible display element and the electromagnetic induction type position detection sensor. However, merely increasing the dimensions of the slits in the reinforcing plate may lower the stiffness of the whole reinforcing plate and result in a failure to attain the desired strength.

BRIEF SUMMARY

In view of the above, an object of the present disclosure is to provide an electronic device capable of suitably detecting pointed positions via an incorporated electromagnetic induction type position detection sensor while being assured of sufficient strength by use of a reinforcing plate.

In solving the above problem and according to one embodiment of the present disclosure, there is provided an electronic device including a display element, a first position detection sensor of an electromagnetic induction type disposed on a back side of the display element, wherein the first position detection sensor of the electromagnetic induction type, in operation, detects a position pointed to on a display screen of the display element, and a reinforcing plate interposed between the display element and the first position detection sensor and has a slit part corresponding to an entire surface of the display screen, the slit part having slits of a first type and of a second type, each of the first type of the slits extending in a vertical direction of the display screen and each of the second type of the slits extending in a horizontal direction of the display screen, the first and the second types of the slits being provided uniformly in a manner having substantially the same opening dimensions.

According to this electronic device, the reinforcing plate is interposed between the display element and the first position detection sensor of the electromagnetic induction type disposed on the back side of the display element. The reinforcing plate has the slit part corresponding to the entire surface of the display screen. The slit part has two types of slits, each of the first type of the slits extending in the vertical direction of the display screen and each of the second type of the slits extending in the horizontal direction of the display screen. The first and the second types of the slits are formed uniformly in a manner having substantially the same opening dimensions. It is thus possible to maintain stiffness over the entire surface of the slit part of the reinforcing plate while making an amount of signals passing (transmitted) through the entire surface of the slit part uniform.

BRIEF DESCRIPTION OF THE SEVERAL VIEWS OF THE DRAWINGS

FIG. 6 is a block diagram for explaining an exemplary configuration of an electromagnetic induction type position detection apparatus;

DETAILED DESCRIPTION

An electronic device practiced as one embodiment of the present disclosure is described below with reference to the accompanying drawings. This disclosure can be applied to diverse electronic devices furnished with a display element and an electromagnetic induction type position detection sensor each. However, the disclosure is applied more advantageously to foldable mobile terminals typically known as a foldable terminal. In view of this, what follows is a description of an example in which the electronic device according to the disclosure is applied to a foldable mobile terminal.

Appearance, etc., of Mobile Terminal 1

Figure 1A:
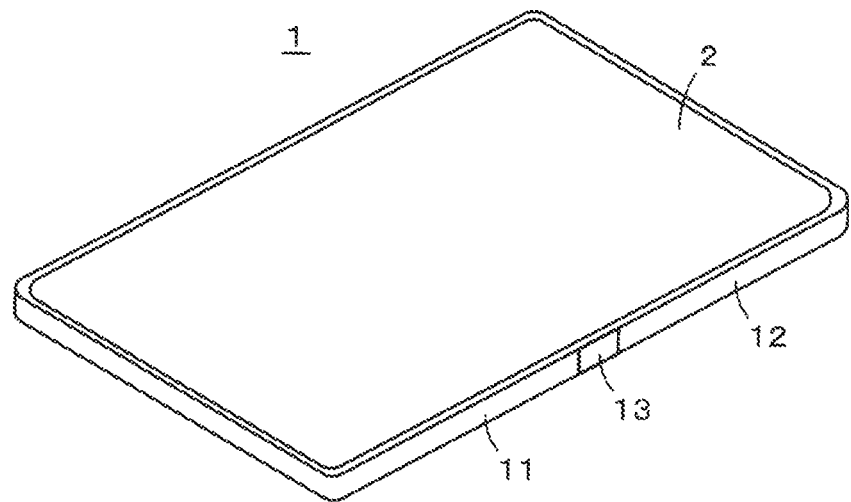
FIG. 1A is a diagram for explaining a mobile terminal configured by use of an electronic device according to an embodiment of the present disclosure.
Figure 1B:
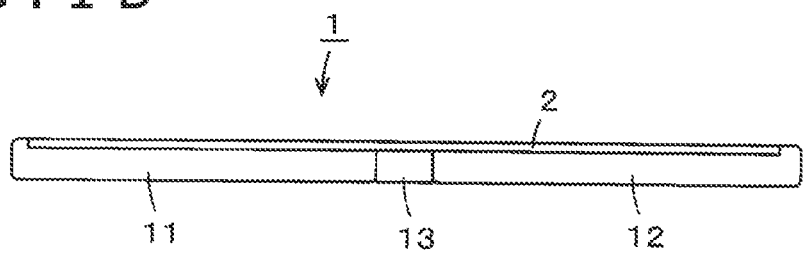
FIG. 1B is another diagram for explaining the mobile terminal configured by use of the electronic device according to an embodiment of the present disclosure.
Figure 1C:
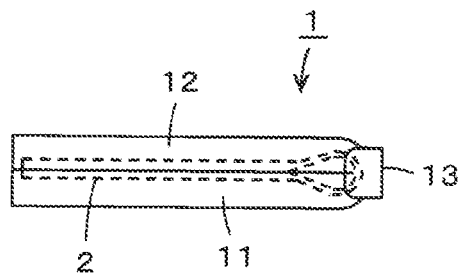
FIG. 1C is another diagram for explaining the mobile terminal configured by use of the electronic device according to an embodiment of the present disclosure.

FIGS. 1A through 1C are diagrams for explaining a foldable mobile terminal (simply referred to as the mobile terminal hereunder) 1 configured by use of an electronic device as one embodiment of the present disclosure. FIG. 1A is a perspective view of the mobile terminal 1 in an opened state. FIG. 1B is a side view of the mobile terminal 1 also in the opened state. FIG. 1C is a side view of the mobile terminal 1 in a state of being folded in half. As depicted in FIGS. 1A and 1B, a first housing 11 and a second housing 12 are connected with each other by a hinge (articulated joint) attached to a cover part 13. The connection allows the mobile terminal 1 to be folded in half, with the first housing 11 and the second housing 12 positioned opposed to each other, as depicted in FIG. 1C.

The mobile terminal 1 is furnished with a flexible part 2. The flexible part 2 includes an organic electroluminescence display such as an organic light-emitting diode (OLED) or light-emitting polymer and an electromagnetic induction type position detection sensor stacked one on top of another. The organic electroluminescence display has flexibility and constitutes a flexible display element that can be bent like a sheet of paper. Also, the electromagnetic induction type position detection sensor includes a flexible substrate as thin as 12 μm (micrometers), for example, which makes the position detection sensor bendable like paper.

Thus, with the mobile terminal 1 in the opened state, the flexible part 2 forms a single display screen viewable by a user over a wide range combining the upper surface of the first housing with that of the second housing, and a position detection area corresponding to the display screen, as depicted in FIGS. 1A and 1B. With the mobile terminal 1 in the closed state, the flexible part 2 is folded in half as indicated by dotted lines in FIG. 1C, with the first and second housings positioned internally opposed to each other. This constitutes a size half that in the opened state.

Because the mobile terminal 1 is foldable as described above, tempered glass cannot be placed over the display screen of the flexible display element for reinforcement. Obviously, two pieces of tempered glass could be disposed separately on the upper surfaces of the first housing 11 and the second housing 12. In this case, however, a seamless single display screen cannot be achieved, with a connecting part of the two pieces of tempered glass appearing at a boundary between the upper surface of the first housing 11 and that of the second housing 12.

A reinforcing plate is thus disposed on the flexible part 2 of the mobile terminal 1 of this embodiment. The reinforcing plate is designed to maintain high strength of the mobile terminal 1. However, there is concern that the reinforcing plate may affect detection of pointed positions via the electromagnetic induction type position detection sensor and make appropriate position detection difficult. In view of this, the mobile terminal 1 has its reinforcing plate arranged in a manner enabling suitable detection of the pointed positions via the electromagnetic induction type position detection sensor as well.

Exemplary Configuration of Flexible Part 2

Figure 2:
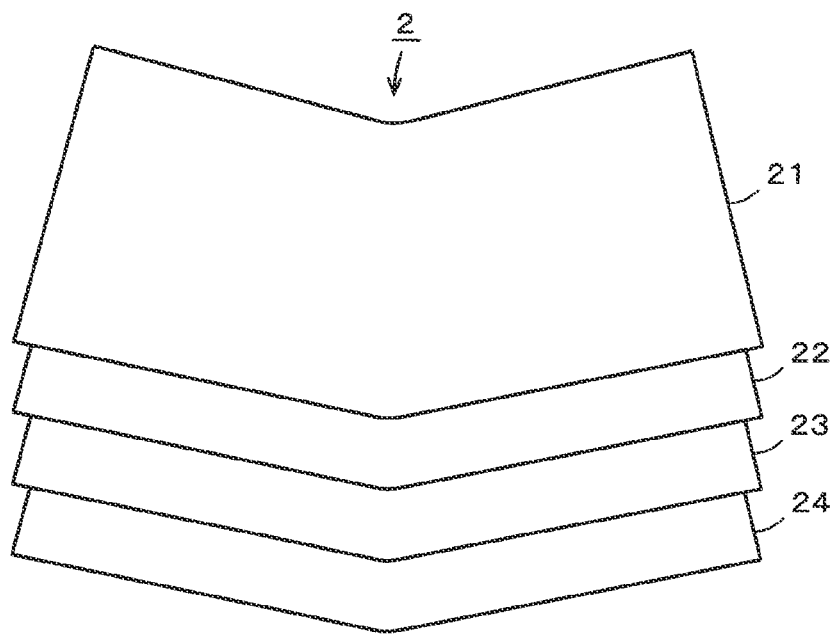
FIG. 2 is a diagram for explaining a flexible part mounted on the mobile terminal according to an embodiment of the present disclosure.
Figure 3:
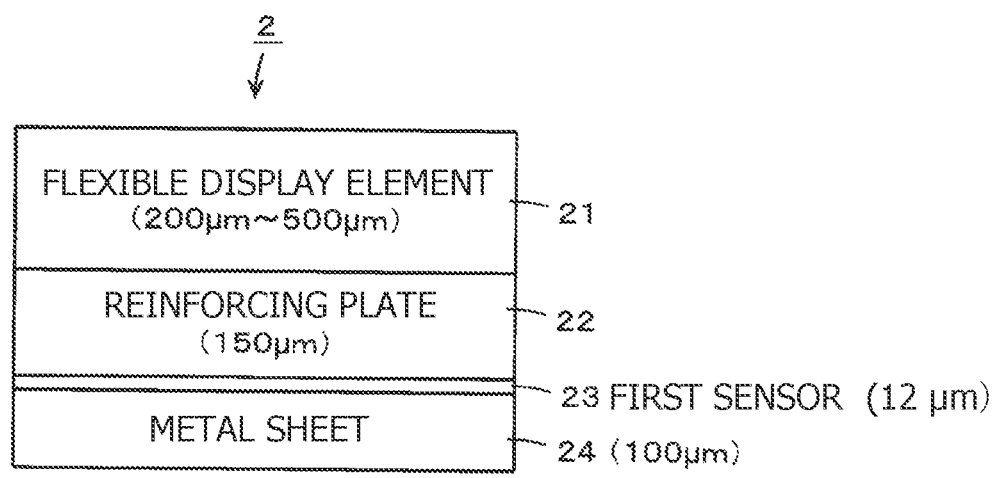
FIG. 3 is another diagram for explaining the flexible part mounted on the mobile terminal according to an embodiment of the present disclosure.

FIGS. 2 and 3 are diagrams for explaining the flexible part 2 mounted on the mobile terminal 1. As depicted in FIG. 2, the flexible part 2 mounted on the mobile terminal 1 has a four-layer structure. Specifically, the topmost layer is a flexible display element 21 provided on its back side with a reinforcing plate 22. On the back side of the reinforcing plate 22 is an electromagnetic induction type position detection sensor (first position detection sensor) 23. A metal sheet is provided on the back side of the position detection sensor 23. In this manner, in this embodiment, the reinforcing plate 22 is interposed between the flexible display element 21 and the electromagnetic induction type position detection sensor 23.

As depicted in FIG. 3, for example, of the layers included in the flexible part 2, the flexible display element 21 is approximately 200 μm to 500 μm thick, the reinforcing plate 22 is approximately 150 μm thick, the position detection sensor 23 is approximately 12 μm thick, and the metal sheet 24 is approximately 100 μm thick. In this embodiment, the metal sheet 24 has both a magnetic layer 50 μm thick arranged on the side of the position detection sensor 23 and a metal layer 50 μm thick arranged under the magnetic layer. In this arrangement, a magnetic flux generated by the electromagnetic induction type position detection sensor 23 passes through the magnetic layer without penetrating the metal layer of the metal sheet 24 and goes to the display element. Because there is little magnetic flux penetrating the metal layer, generation of an eddy current can be inhibited, which can prevent attenuation of the magnetic flux. Also, the metal layer in the metal sheet 24 prevents the magnetic flux generated by the position detection sensor 23 from extending below the metal layer while protecting against magnetic effects of electronic circuits located under the metal sheet 24.

The reinforcing plate 22 is formed preferably with a material not conducive to generating eddy currents such that the magnetic flux will suitably be allowed to pass therethrough and that the position detection sensor 23 will not be affected electrically. That is, the reinforcing plate 22 is desired to be formed with a non-magnetic material with low conductivity. For that purpose, the reinforcing plate 22 of this embodiment is made of stainless steel. More specifically, the reinforcing plate 22 is formed of a stainless-steel material with the Japanese Industrial Standards (JIS) steel type number of SUS316.

The stainless-steel material with the JIS steel type number of SUS316 is used advantageously to form the reinforcing plate 22 because the material is non-magnetic, resists developing magnetic poles, has high electrical resistance, is not conducive to generating eddy currents, and provides high stiffness. As depicted in FIG. 3, the reinforcing plate 22 is 1.5 times as thick as the metal sheet 24. This reinforces the strength of the mobile terminal 1. Still, the reinforcing plate 22 is not limited to being formed of the SUS316 stainless-steel material. It is obviously possible to use any other suitable material to form the reinforcing plate 22 as long as the material, such as a hard resin, has low conductivity and offers desired stiffness.

Although made of a non-magnetic material with high electrical resistivity, the reinforcing plate 22 still has a certain thickness. That means the reinforcing plate 22 may hamper the transmission and reception of signals (magnetic flux) between the electromagnetic induction type position detection sensor 23 and an electromagnetic induction type electronic pen, not depicted. Preferably, between the electromagnetic induction type position detection sensor 23 and the electromagnetic induction type electronic pen, the magnetic flux should pass uniformly through any position in the position detection area of the position detection sensor 23. For that purpose, slits are formed in the reinforcing plate 22. In this case, depending on how the slits are formed, the stiffness of the reinforcing plate 22 may negatively be affected, which may contribute to giving insufficient strength to the mobile terminal 1.

In addition, since the reinforcing plate 22 is attached to the back side of the flexible display element 21, irregularities of the reinforcing plate 22 attributable to its slits may cause display unevenness. Also, because the flexible display element 21 is thin and soft in characteristics, the irregularities of the slits formed in the reinforcing plate 22 disposed on the back side of the flexible display element 21 may conceivably affect the thickness of lines that are rendered. That is, the rendered lines may not be uniform in thickness, i.e., partially thin and partially thick. There may be a case where the lines appear wavy when rendered.

Thus, when the slits are to be formed in the reinforcing plate 22, it is necessary to satisfy the following three conditions: (1) the magnetic flux should uniformly pass through any position in the position detection area; (2) desired stiffness should be maintained; and (3) the slits should have a uniform density pattern such that there will not be display unevenness or rendered images being wavy in appearance. As will be discussed later, the electromagnetic induction type position detection sensor includes multiple X-axis loop coils arranged in the X-axis direction (horizontal direction), each extending in the Y-axis direction (vertical direction), and with multiple Y-axis loop coils arrayed in the Y-axis direction (vertical direction), each extending in the X-axis direction (horizontal direction). In this case, the X-axis loop coils are configured linearly in the vertical direction, and the Y-axis loop coils are configured linearly in the horizontal direction. It is therefore necessary to take into consideration the above-described characteristics of the electromagnetic induction type position detection sensor as it is configured.

With the above points taken into consideration, the embodiment has two types of slits formed in the reinforcing plate 22 evenly in density and in such a manner that their opening dimensions are approximately the same, one type of slits extending in the vertical direction (Y-axis direction) of the display screen, the other type of slits extending in the horizontal direction (X-axis direction) of the display screen. Also, the display screen of the flexible display element 21, a slit area in which the slits are formed in the reinforcing plate 22, and the position detection area of the electromagnetic induction type position detection sensor are made to be approximately the same in shape and in dimensions. Even more optimally, in a case where the slit area is made to be slightly wider, the effects of a frame part, to be discussed later, are made smaller, which contributes to improving rendering accuracy.

The above arrangements can improve the strength of the mobile terminal 1 by use of the reinforcing plate 22 with the slits formed therein in a manner maintaining the stiffness of the entire surface of the display screen of the flexible display element 21. Moreover, the reinforcing plate 22 has two types of slits, i.e., the slits extending in the vertical direction of the display screen and those extending in the horizontal direction thereof, both types of slits being formed evenly in density and in such a manner that their opening dimensions are approximately the same. This makes it possible to keep the irregularities of the slits unobtrusive while not impeding the suitable transmission and reception of the magnetic flux.

Exemplary Configuration of Reinforcing Plate 22

Figure 4A:
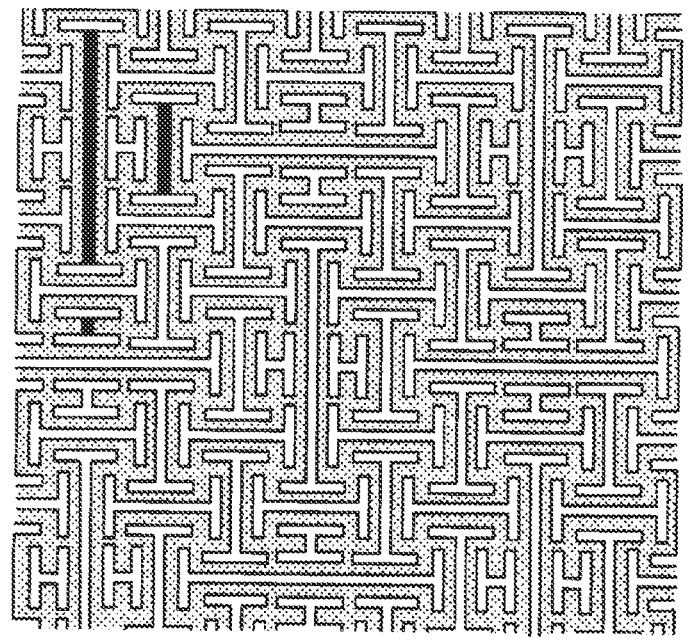
FIG. 4A is a diagram for explaining a reinforcing plate for the flexible part of the mobile terminal according to an embodiment of the present disclosure.
Figure 4B:
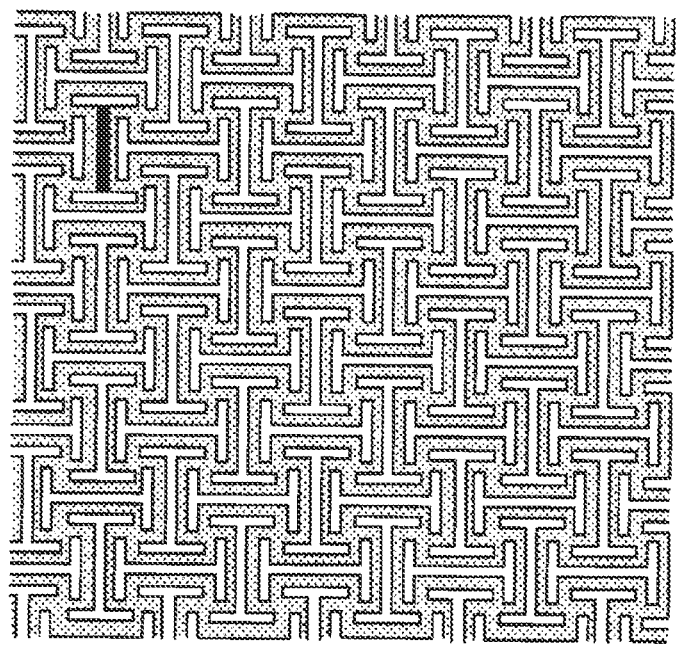
FIG. 4B is another diagram for explaining the reinforcing plate for the flexible part of the mobile termina according to an embodiment of the present disclosure.

FIGS. 4A and 4B are diagrams for explaining the reinforcing plate 22 for the flexible part 2 of the mobile terminal 1. FIGS. 4A and 4B depict H-shaped slits each formed with two parallel bar-like slits of the same length connected by one bar-like slit at their intermediate points, the H-shaped slits being arrayed in the vertical and horizontal directions to form the slit area. In the examples in FIGS. 4A and 4B, each bar-like slit is 0.5 mm wide (a width in a direction intersecting the longitudinal direction).

FIG. 4A depicts a slit area formed in the reinforcing plate 22 using three types of H-shaped slits, each H-shaped slit being made of two parallel bar-like slits having the same length and connected at their intermediate points by one bar-like slit having a different length, as illustrated filled with black in the top left corner of the drawing. FIG. 4B depicts a slit area formed in the reinforcing plate 22 using a single type of H-shaped slit made of two parallel bar-like slits having the same length and connected at their intermediate points by one bar-like slit having a common length, as illustrated filled with black in the top left corner of the drawing.

In the examples in FIGS. 4A and 4B, the H-shaped slits are arranged in such a manner that two slits having the same crosswise length and two slits having the same longitudinal length are alternated in the vertical and horizontal directions. In both examples in FIGS. 4A and 4B, the slit area in the reinforcing plate 22 can have the slits disposed evenly in density. That is, the opening dimensions of the slits extending vertically are approximately the same as those of the slits extending horizontally inside the slit area. Thus, the bare metal portions in the slit area not provided by the slits are also distributed evenly within the slit area.

As a result, the slits disposed in the reinforcing plate 22 do not reduce overall stiffness of the reinforcing plate 22. Because the H-shaped slits can be arranged evenly in density all over the slit area, there are no display screen irregularities. That means there is no display unevenness and that there are no wavy lines being rendered. Obviously, the evenly arranged H-shaped slits allow the magnetic flux to penetrate, inhibit generation of eddy currents attributable to the magnetic flux passing through the reinforcing plate, and thereby enable the suitable transmission and reception of the magnetic flux.

Note that the difference between the examples in FIGS. 4A and 4B lies in the coupling rate (combining ratio) of magnetic fluxes. In a case where there is no reinforcing plate 22 and where the coupling rate of magnetic fluxes between the position detection sensor 23 and the position pointer is assumed to be 100%, the coupling rate of the example in FIG. 4A is 89.1%, whereas the coupling rate of the example in FIG. 4B is 88.1%. Experiments demonstrated that the coupling rate is improved by use of slits with different lengths.

Configuration of Bendable Part of Reinforcing Plate

Figure 5A:
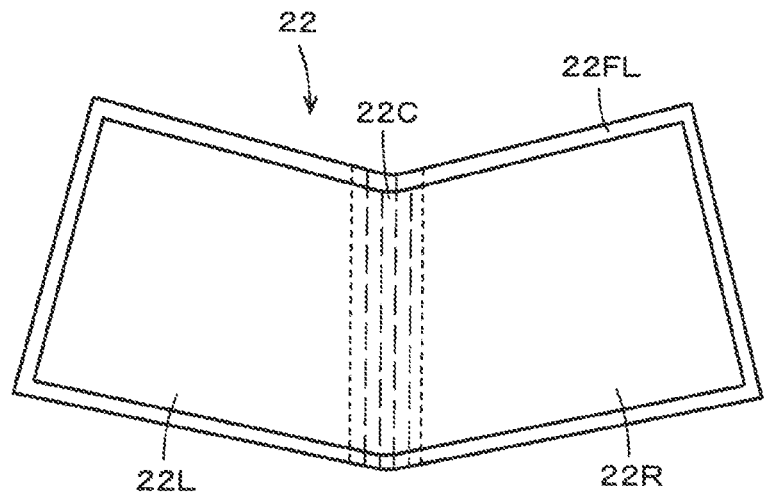
FIG. 5A is a diagram for explaining a bendable part of the reinforcing plate for the flexible part of the mobile terminal according to an embodiment of the present disclosure.
Figure 5B:
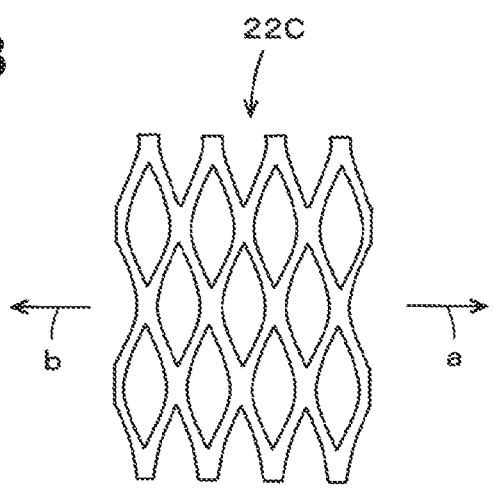
FIG. 5B is another diagram for explaining the bendable part of the reinforcing plate for the flexible part of the mobile terminal according to an embodiment of the present disclosure.

FIGS. 5A and 5B are diagrams for explaining a bendable part of the reinforcing plate 22 for the flexible part 2 mounted on the mobile terminal 1. In a case where the slits are disposed all over the reinforcing plate 22 in a manner depicted in FIGS. 4A and 4B, the mobile terminal 1 may not be able to be folded smoothly as indicated in FIG. 1C. The presence of the bare metal portions extending in a direction intersecting the bendable part will make it difficult to bend the mobile terminal 1 and can easily result in damage.

Therefore, as depicted in FIG. 5A, a bendable part 22C is provided in the central part of the reinforcing plate 22. A left-side slit part 22L is disposed on the left side of the bendable part 22C, and a right-side slit part 22R is disposed on the right side. The left-side slit part 22L and the right-side slit part 22R are provided with the H-shaped slits arranged evenly in density over the respective entire surfaces as depicted in FIG. 4A or 4B. As indicated in FIG. 5B, the bendable part 22C is shaped to have a mesh-like pattern with multiple openings having an approximately rhombic shape. The bendable part 22C shaped into the mesh-like pattern is allowed to extend slightly in the directions indicated by arrows a and b. This makes it possible to bend the bendable part 22C smoothly (in half).

Also, as depicted in FIG. 5A, a frame part 22FL having basically no slits therein is provided in the outer edge of the reinforcing plate 22. Inside of the frame part 22FL is the slit area corresponding to the display screen of the flexible display element. The slit area also corresponds to the position detection area of the electromagnetic induction type position detection sensor. That means the frame part 22FL does not overlap with the display screen or with the position detection area. The frame part 22FL does not essentially be provided with the slits. In order to prevent magnetic flux turbulence attributable to the frame part 22FL, the slit area may be formed to be as wide as, or slightly wider than, the position detection area. This further improves the accuracy of position pointing even at the margins of the display screen.

Note that the top and bottom edges of the bendable part 22C may also be provided with a mesh-like slit structure as in the other portions of the bendable part 22C. The structure contributes to allowing the mobile terminal 1 to be bent and opened smoothly. Conceivably, the left-side slit part 22L and the right-side slit part 22R might also be provided with a mesh-like slit structure as with the bendable part 22C. Still, when compared, the H-shaped slit screen (in FIGS. 4A and 4B) keeps stiffness higher than the mesh-like slit pattern (in FIG. 5B).

Alternatively, the bendable part 22C may be provided with I-shaped slits along its fold line. That is, the bendable part 22C may include the multiple slits extending along the fold line. In this case, there is no bare metal portion extending in a direction intersecting the fold line, which permits smooth bending.

Also, the slit shapes differ between the left-side slit part 22L and right-side slit part 22R on one hand and the bendable part 22C on the other hand, so that the magnetic flux coupling rates also differ therebetween. This may lead to a possibility of erroneous detection of pointed positions at the bendable part 22C. To counter this possibility, the detection output of the position detection sensor 23 at the bendable part 22C is corrected, as will be discussed later. The correction permits pointed position detection in a manner similar to that in the left-side slit part 22L and right-side slit part 22R provided with the H-shaped slits.

Exemplary Configuration of Electromagnetic Induction Type Position Detection Apparatus FIG. 6 is a block diagram for explaining an exemplary configuration of a position detection apparatus that includes the electromagnetic induction type position detection sensor 23. An electronic pen 300 is of the electromagnetic induction type. As depicted in the top left corner of FIG. 6, the electronic pen 300 has a resonance circuit including a coil L for signal transmission and reception, a writing pressure detection part Cv working as a variable capacitance capacitor, and a resonant capacitor Cf, or like component connected in parallel with one another.

A position detection apparatus 100 has a position detection sensor 23 formed with an X-axis direction loop coil group 23X and a Y-axis direction loop coil group 23Y stacked one on top of another. Loop coils $X_1, X_2, \ldots, X_{40}$ constituting the X-axis loop coil group 23X and loop coils $Y_1, Y_2, \ldots, Y_{30}$ constituting the Y-axis loop coil group 23Y have one or multiple turns each. The position detection sensor 23 configured in this manner is disposed under the reinforcing plate 22 located at the back side of the flexible display element 21 as discussed above. The position detection sensor 23 is connected with a position detection circuit 101 to form the position detection apparatus 100 as a whole.

The position detection circuit 101 is disposed inside the first housing 11 or the second housing 12 under the metal sheet 24. The position detection circuit 101 includes an oscillator 102, a current driver 103, a selection circuit 104, a connection switching circuit 105, a receiving amplifier 106, a position detecting circuit 107, a writing pressure detecting circuit 108, and a controller 109. As depicted in FIG. 6, the X-axis direction loop coil group 23X and Y-axis direction loop coil group 23Y of the position detection sensor 23 are connected with the selection circuit 104. Under control of the controller 109, the selection circuit 104 consecutively selects one after another the loop coils in the two loop coil groups 23X and 23Y.

The controller 109 includes a microprocessor. The controller 109 controls selection of loop coils by the selection circuit 104 and switching of the connection switching circuit 105. At the same time, the controller 109 controls the processing timing for the position detecting circuit 107 and for the writing pressure detecting circuit 108.

The oscillator 102 generates an alternating-current signal with a frequency f0. The oscillator 102 supplies the generated alternating-current signal to the current driver 103 and to the writing pressure detecting circuit 108. The current driver 103 converts the alternating-current signal fed from the oscillator 102 into a current for output to the connection switching circuit 105. Under control of the controller 109, the connection switching circuit 105 switches the connection destination (transmitting-side terminal T or receiving-side terminal R) to which the loop coil selected by the selection circuit 104 is connected. Of these connection destinations, the transmitting-side terminal T is connected with the current driver 103; the receiving-side terminal R is connected with the receiving amplifier 106.

The connection switching circuit 105 is switched to the transmitting-side terminal T during a transmission period and to the receiving-side terminal R during a reception period. During the transmission period, the loop coil supplied with the current from the current driver 103 via the transmitting-side terminal T generates a magnetic field for transmission to the electronic pen 300. The transmitted magnetic field acts on the resonance circuit of the electronic pen 300. In this case, the resonance circuit of the electronic pen 300 generates a position-indicating signal (radio waves) for transmission to the position detection sensor 23.

During the reception period, on the other hand, the loop coil selected by the selection circuit 104 is connected to the receiving amplifier 106 via the receiving-side terminal R. While the loop coil is being affected by the magnetic field from the electronic pen 300, an induced voltage generated in the loop coil is transmitted to the receiving amplifier 106 via the selection circuit 104 and the connection switching circuit 105. The receiving amplifier 106 amplifies the induced voltage fed from the loop coil and transmits the amplified voltage to the position detecting circuit 107 and to the writing pressure detecting circuit 108.

That is, in each of the loop coils in the X-axis direction loop coil group 23X and Y-axis direction loop coil group 23Y, the induced voltage is generated by the radio waves transmitted from the electronic pen 300. The position detecting circuit 107 detects the induced voltage (reception signal) generated in the loop coil and converts the detected output signal to a digital signal for output to the controller 109. The controller 109 calculates the coordinate values of the position pointed by the electronic pen 300 in the X-axis and Y-axis directions on the basis of the level of the induced voltage generated in each loop coil.

Meanwhile, the writing pressure detecting circuit 108 synchronously detects the output signal of the receiving amplifier 106 using the alternating-current signal from the oscillator 102, and obtains a signal with its level corresponding to the phase difference (frequency shift) between the two signals. In this case, the signal corresponding to the phase difference (frequency shift) is converted to a digital signal for output to the controller 109. The controller 109 detects a writing pressure applied to the electronic pen 300 based on the level of the signal corresponding to the phase difference (frequency shift) between the digital signal from the writing pressure detecting circuit 108, i.e., between the transmitted radio waves on one hand, and the received radio waves on the other hand.

Incidentally, as described above, the position detecting circuit 107 and the writing pressure detecting circuit 108 correct the output signal from the loop coils in the portions corresponding to the bendable part 22C of the reinforcing plate 22 located on the upper surface side of the position detection sensor 23. The correction makes it possible to detect the pointed positions by aligning conditions of those portions of the position detection sensor 23 which correspond to the bendable part 22C with conditions of the portions where the H-shaped slits are disposed. As a result, even when a position on the bendable part 22C is pointed, the pointed position and the writing pressure involved can be detected appropriately.

As described above, the position detection circuit 101, switching between the signal transmission and reception periods, supplies drive power to the electronic pen 300 for driving during the transmission period and receives the signal from the electronic pen 300 during the reception period so as to detect the pointed position and writing pressure. The position detection circuit 101 is assumed to have a circuit-board configuration. Thus, connecting a cable part of the position detection sensor 23 with the position detection circuit 101 in this circuit-board configuration implements the position detection apparatus 100, which can be mounted as an input device on the mobile terminal 1.

The mobile terminal 1 of this embodiment thus has the reinforcing plate 22 interposed between the flexible display element 21 and the electromagnetic induction type position detection sensor 23. Whereas the reinforcing plate 22 is formed of the SUS316 stainless steel, for example, the slit area with the uniform slit pattern is provided over the display screen of the flexible display element 21 and over those portions of the position detection sensor 23 which correspond to the position detection area. This provides strength to the mobile terminal 1 by maintaining the stiffness of the reinforcing plate 22. At the same time, display unevenness is not produced on the display screen, with signal transmission and reception carried out appropriately between the electromagnetic induction type position detection sensor 23 and the electromagnetic induction type electronic pen 300. Needless to say, the mobile terminal 1 can be folded and opened with ease.

Another Example of Flexible Part

The above-described flexible part 2 of the mobile terminal 1 of the embodiment is equipped with the electromagnetic induction type position detection sensor 23. Alternatively, in addition to the electromagnetic induction type position detection sensor 23, a capacitive type position detection sensor may further be included. This makes it possible to implement a hybrid mobile terminal 1 permitting pointing input by use of a user's fingers or a generally-called capacitive pen, as well as pointing input using the electromagnetic induction type electronic pen.

Figure 7:
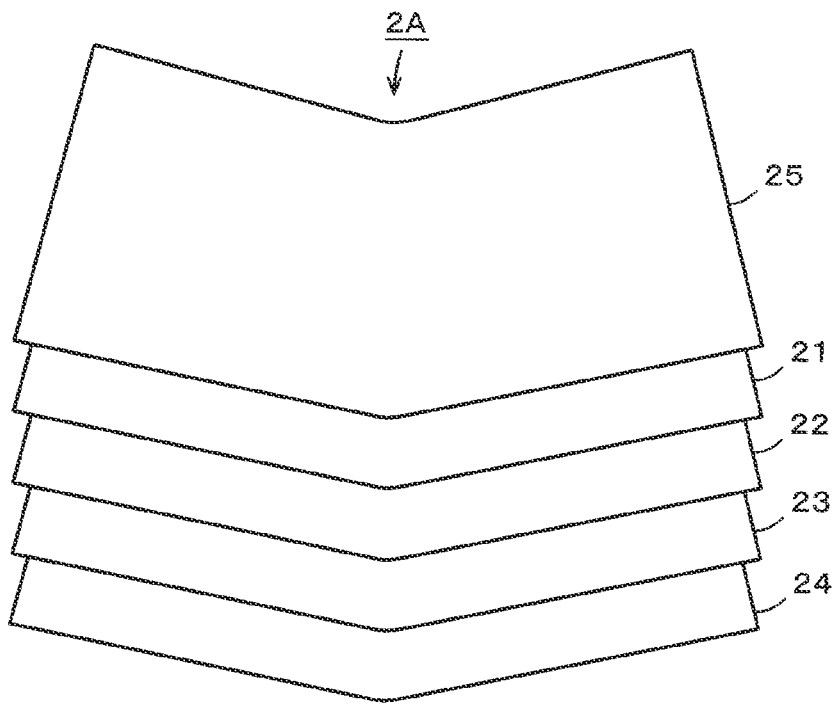
FIG. 7 is a diagram for explaining another example of the flexible part mounted on the mobile terminal according to an embodiment of the present disclosure.
Figure 8:
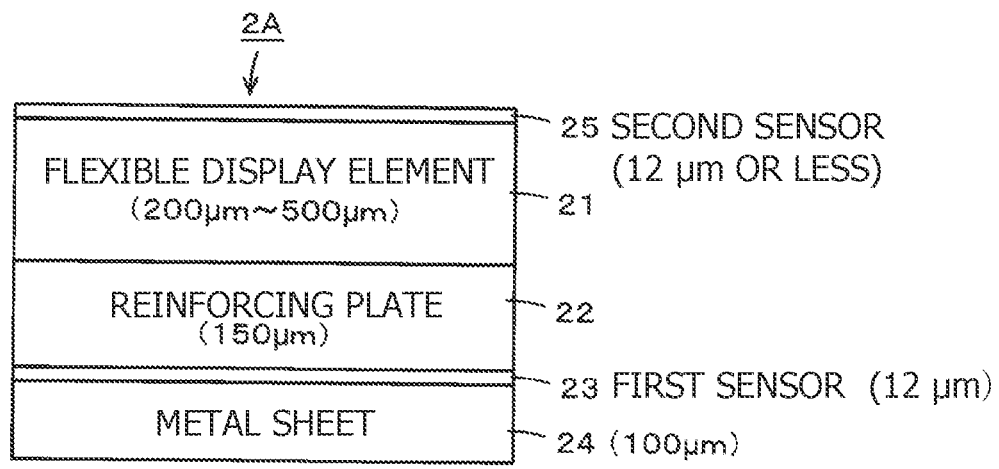
FIG. 8 is a diagram for explaining an exemplary configuration of the flexible part depicted in FIG. 7.

FIGS. 7 and 8 are diagrams for explaining a flexible part 2A mounted on a mobile terminal 1A. In the flexible part 2A in FIGS. 7 and 8, the components configured similarly to those of the flexible part 2 in FIGS. 2 and 3 are indicated by the same reference signs, and their detailed explanations are omitted where redundant. In FIGS. 7 and 8, a capacitive type position detection sensor (second position detection sensor) 25 can be configured to be transparent with use of a thin linear electrode. This configuration allows the position detection sensor 25 to be disposed on the upper surface side of the flexible display element 21. That is, as depicted in FIG. 7, the flexible part 2A can be formed of the capacitive type position detection sensor 25 stacked on top of the flexible display element 21 followed thereunder by the reinforcing plate 22, the electromagnetic induction type position detection sensor 23, and the metal sheet 24, in that order.

Thus, as indicated in FIG. 8, the flexible part 2A can include the capacitive type position detection sensor 25, which is transparent and thinner than the electromagnetic induction type position detection sensor 23, disposed on the upper surface side of the flexible display element 21. In this case, too, as depicted in FIGS. 7 and 8, the reinforcing plate 22 is interposed between the flexible display element 21 and the electromagnetic induction type position detection sensor 23. As described above, the reinforcing plate 22 is non-magnetic and has high electrical resistivity, which makes it less likely to generate eddy currents.

The reinforcing plate 22 is thus less likely to generate eddy currents despite the presence of the electromagnetic induction type position detection sensor 23 generating an alternating magnetic field, which changes repeatedly in magnitude and direction over time. For this reason, the detection of pointed positions via the capacitive type position detection sensor 25 is not affected. In other words, it is possible to configure the mobile terminal 1A capable of favorably detecting the pointed positions either by use of the capacitive type position detection sensor 25 or via the electromagnetic induction type position detection sensor 23. Further, the presence of the reinforcing plate 22 boosts the strength of the entire upper surface side of the mobile terminal 1 where the display screen of the flexible display element 21 is disposed. This makes it possible to implement the mobile terminal 1 with high strength even in its opened state.

Exemplary Configuration of Capacitive Type Position Detection Apparatus

Figure 9:
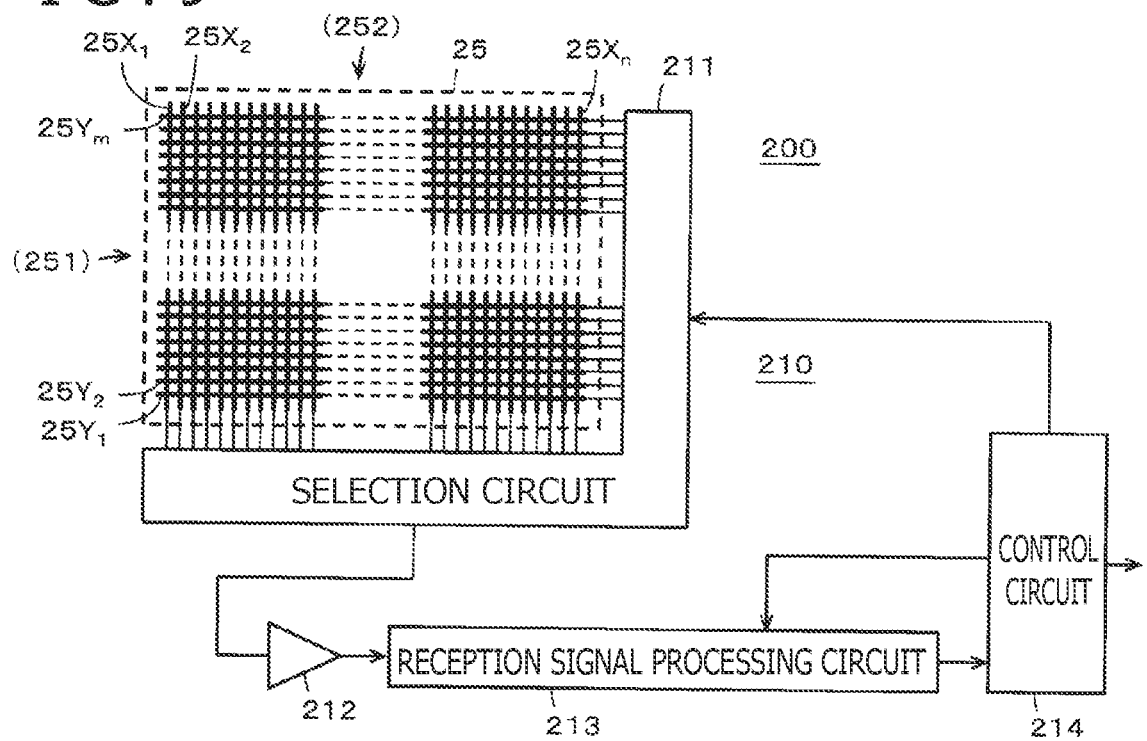
FIG. 9 is a block diagram for explaining an exemplary configuration of a capacitive type position detection apparatus.

FIG. 9 is a block diagram for explaining an exemplary configuration of a capacitive type position detection apparatus 200 mounted on the mobile terminal 1A. As depicted in FIG. 9, the position detection apparatus 200 includes a position detection sensor 25 and a position detection circuit 210 connected therewith.

The position detection sensor 25 is formed by a first conductor group 251 and a second conductor group 252 stacked one on top of another. For example, the first conductor group 251 has multiple first conductors $25Y_1$ through $25Y_m$ arranged in parallel a predetermined distance apart from each other in the Y-axis direction, each conductor extending in the horizontal direction (X-axis direction). The second conductor group 252 has multiple second conductors $25X_1$ through $25X_n$ arranged in parallel a predetermined distance apart from each other in the X-axis direction, each conductor extending in a direction intersecting the first conductors $25Y_1$ through $25Y_m$, i.e., in the longitudinal direction (Y-axis direction) perpendicular to the first conductors $25Y_1$ through $25Y_m$, in this example.

As described, the position detection sensor 25 of the position detection apparatus 200 is configured to detect the positions pointed by the user's fingers or by the capacitive type electronic pen (capacitive pen) using a sensor pattern formed by having the first conductor group 251 and the second conductor group 252 intersecting with each other. Note that, in the ensuing explanation with reference to FIG. 9, any one of the first conductors $25Y_1$ through $25Y_m$ will be described as the first conductor 25Y, and any one of the second conductors $25X_1$ through $25X_n$ will be indicated as the second conductor 25X.

The position detection circuit 210 includes a selection circuit 211 working as an input/output interface with the position detection sensor 25, an amplification circuit 212, a reception signal processing circuit 213, and a control circuit 214. The reception signal processing circuit 213 includes a band-pass filter, a detection circuit, a sample-hold circuit, and an analog to digital (AD) conversion circuit, not depicted.

On the basis of control signals from the control circuit 214, the selection circuit 211 selects one conductor 25Y or 25X from among the first conductor group 251 and the second conductor group 252. The conductor selected by the selection circuit 211 is connected to the amplification circuit 212. A signal reflecting the change in potential caused by contact with the user's fingers or with the capacitive pen is detected by the selected conductor before being amplified by the amplification circuit 212. The output of the amplification circuit 212 is supplied to the reception signal processing circuit 213. The reception signal processing circuit 213 subjects the supplied signal to band limitation and detection processing, before sample-holding the processed signal for conversion into a digital signal to be supplied to the control circuit 214.

The control circuit 214 controls the selection circuit 211 by supplying it with control signals using programs stored in an internal read-only memory (ROM). The control circuit 214 also controls the reception signal processing circuit 213 by supplying it with control signals. Further, the control circuit 214 calculates the coordinates of that position on the position detection sensor 25 which is pointed by the user's fingers or by the capacitive pen. Note that, in the case of using a so-called active capacitive pen that outputs a position indicating signal or a writing pressure signal, the control circuit 214 further carries out a process of detecting, from digital data coming from the reception signal processing circuit 213, the writing pressure that is detected by a writing pressure detection part of the active capacitive pen.

In this manner, the position detection apparatus 200 detects the position pointed by the user's fingers or by the capacitive pen, and supplies the detected position typically to a computer apparatus, so that the process corresponding to an icon located in the pointed position can be executed, for example. In the case of the mobile terminal 1A incorporating both the above-described capacitive type position detection apparatus 200 and the electromagnetic induction type position detection apparatus 100 explained with reference to FIG. 6, one of the two apparatuses can be used selectively. That is, a simple operation may be performed by use of the user's fingers, for example, and the pointing input of the operation can be received by the capacitive type position detection apparatus 200. In a case where detailed rendering is desired to be carried out, the electromagnetic induction type electronic pen 300 is used for rendering, with the electromagnetic induction type position detection apparatus 100 receiving the pointing input of the rendering.

In addition, even in a case where both the capacitive type position detection sensor 25 and the electromagnetic induction type position detection sensor 23 are incorporated, the reinforcing plate 22 is still disposed to let its stiffness provide sustained strength to the mobile terminal 1. At the same time, with no display unevenness occurring on the display screen and with no wavy lines rendered, the electromagnetic induction type position detection sensor 23 and the electromagnetic induction type electronic pen 300 perform suitable transmission and reception of signals therebetween. Needless to say, the mobile terminal 1 can be folded and opened with ease. Further, without being affected by the electromagnetic induction type position detection sensor 23, the detection of pointed positions can be made appropriately by means of the capacitive type position detection sensor 25.

Advantageous Effects of Embodiment

The mobile terminal 1 with the above embodiment has the reinforcing plate 22 arranged between the flexible display element 21 and the electromagnetic induction type position detection sensor 23. The arrangement can provide the mobile terminal 1 with the strength reflecting the stiffness of the reinforcing plate 22. Further, the entire slit area is provided with two types of slits, one type of slits extending each in the vertical direction of the display screen and another type of slits extending each in the horizontal direction thereof, in a uniform manner such that both types of slits have approximately the same opening dimensions. This prevents display unevenness and permits suitable transmission and reception of magnetic fluxes at any position in the slit area with no impediments. Further, in the case of the above-described mobile terminal 1A, the capacitive type position detection sensor 25 disposed on the upper surface side of the flexible display element 21 is not affected by the electromagnetic induction type position detection sensor 23 because of the effects of the reinforcing plate 22. As a result, the detection of pointed positions can suitably be carried out via the capacitive type position detection sensor 25.

Alternative Examples

Figures 10A, 10B, 10C:
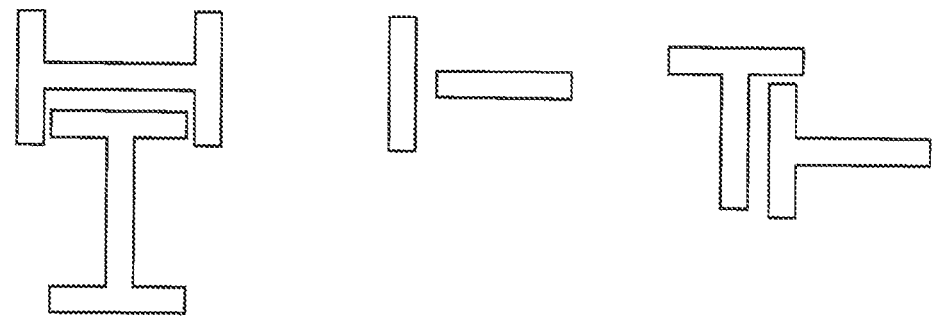
FIG. 10A is a diagram for explaining a shape pattern of slits formed in a slit part of the reinforcing plate.
FIG. 10B is a diagram for explaining another shape pattern of slits formed in the slit part of the reinforcing plate.
FIG. 10C is a diagram for explaining another shape pattern of slits formed in the slit part of the reinforcing plate.

FIGS. 10A through 10F are diagrams for explaining shape patterns of slits formed in the slit part of the reinforcing plate. In the above-described embodiment, as depicted in FIG. 10A, the H-shaped slits are adopted, with every two parallel slits of the same length being connected at their intermediate points by one slit. However, this is not limitative of the embodiment.

Figure 10D:
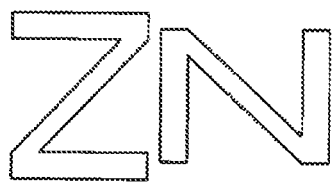
FIG. 10D is a diagram for explaining another shape pattern of slits formed in the slit part of the reinforcing plate.

Alternatively, as indicated in FIG. 10B, an I-shaped bar-like slit may be repeated with its array direction changed to form the slit area with a uniform density pattern in the reinforcing plate 22. As another alternative, as depicted in FIG. 10C, a T-shaped slit formed of a horizontal bar and a vertical bar may be repeated to form the slit area with a uniform density pattern in the reinforcing plate 22. As a further alternative, as indicated in FIG. 10D, a Z-shaped slit having two crosswise bars connected by a diagonal bar may be repeated to form the slit area with a uniform density pattern in the reinforcing plate 22.

As other alternatives, the H-shaped slits and the I-shaped slits may be combined, the H-shaped slits and the T-shaped slits may be combined, or other slits of different molds (figures) may be combined in order to form the slit area in the reinforcing plate 22. Other suitable combinations of the slits having diverse shapes may be used to form the slit area in the reinforcing plate 22. In such cases, what is important is to meet the following three conditions: (1) the stiffness of the reinforcing plate 22 should be maintained; (2) the spacing between the slits should not be so large as to produce irregularities on the display screen of the flexible display element 21, resulting in display unevenness; and (3) between the electromagnetic induction type position detection sensor 23 and the electromagnetic induction type electronic pen 300, the transmission and reception of magnetic fluxes should evenly be performed at any position in the position detection area of the position detection sensor 23.

The above-described embodiment uses the flexible display element 21 so as to implement the foldable mobile terminal 1. The flexible display element 21 is not limited to the organic electroluminescence display such as the OLED or light-emitting polymer. A display element known as the electronic paper may also be used obviously as the flexible display element 21. Of the display media offering visibility and portability assumed to be advantages of paper, the electronic paper allows its display content to be electrically overwritten. Note that, when simply structured, the electronic paper has a large number of very small white-colored balls and as many tiny black-colored hemispheres embedded in the display. With the balls statically charged in part, the balls in the display are rotated by electric fields to let letters appear in black against the white background. In recent years, there have appeared those types of electronic paper that are capable of color display.

As another alternative, the display element is not limited to the flexible display element; the display element may also be a generally-called panel display such as the liquid crystal display (LCD) or plasma display. Still, practicing this disclosure by use of the flexible display element such as the OLED or the electronic paper as the display element gives strength to the mobile terminal without using tempered glass. Thus, the present disclosure is practiced more advantageously in a case where the generally-called foldable terminal is formed by use of the flexible display element.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device comprising:
   a display element;
   a first position detection sensor of an electromagnetic induction type disposed on a back side of the display element, wherein the first position detection sensor, in operation, detects a position pointed to on a display screen of the display element; and
   a reinforcing plate interposed between the display element and the first position detection sensor and has a slit part corresponding to an entire surface of the display screen, the slit part having slits of a first type of and of a second type, each of the first type of the slits extending in a vertical direction of the display screen and each of the second type of the slits extending in a horizontal direction of the display screen, the first and second types of the slits being provided uniformly in a manner having substantially same opening dimensions,
   wherein the display element and the first position detection sensor are bendable, and
   wherein the reinforcing plate is configured to be foldable and includes a bendable part disposed in a position in which the display element and the first position detection sensor are bendable, the bendable part having bendable slits provided therein.

2. The electronic device according to claim 1, wherein an outer edge of the reinforcing plate is provided with a frame part with no slits provided therein.

3. The electronic device according to claim 1, wherein an outer edge of the reinforcing plate is provided with a frame part with no slits provided therein, and
   the frame part does not overlap with the display screen of the display element.

4. The electronic device according to claim 1, wherein the display screen of the display element, a position detection area of the first position detection sensor, and a slit area with the slits of the reinforcing plate provided therein are substantially same in shape and dimensions and are stacked one on top of another.

5. The electronic device according to claim 1, wherein the reinforcing plate is formed of a non-magnetic material.

6. The electronic device according to claim 1, wherein the reinforcing plate is formed of stainless steel.

7. The electronic device according to claim 1, wherein the reinforcing plate is formed of a stainless-steel material having Japanese Industrial Standards steel type number of SUS316.

8. The electronic device according to claim 1, wherein the display element and the first position detection sensor are bendable, and
   wherein the reinforcing plate is configured to be foldable and includes a bendable part disposed in a position in which the display element and the first position detection sensor are bendable, the bendable part having bendable slits provided therein.

9. The electronic device according to claim 1, wherein the display element and the first position detection sensor are bendable, and
   wherein the reinforcing plate is configured to be foldable and includes a bendable part disposed along an axis when being bent in a position in which the display element and the first position detection sensor are bent, the bendable part having bar-like I-shaped slits provided therein.

10. The electronic device according to claim 1, wherein the slits of the reinforcing plate include any of slits that are each I-shaped, slits that are each T-shaped and include a horizontal bar and a vertical bar, slits that are each Z-shaped slit and include two horizontal bars connected by one diagonal bar, or slits that are each H-shaped and include two vertical bars connected by one horizontal bar.

11. The electronic device according to claim 1, wherein the display element includes of a liquid crystal display, an organic electroluminescence display, or an electronic paper display.

12. The electronic device according to claim 1, further comprising:
   a second position detection sensor of a capacitive type disposed on a surface side of the display element, wherein the second position detection sensor, in operation, detects the position pointed to on the display screen of the display element.

* * * * *